United States Patent [19]

Burwasser

[11] 3,857,729

[45] Dec. 31, 1974

[54] INDICIA RECEIVING MATTE SHEET MATERIALS HAVING AN OUTERMOST ANTISTATIC LAYER

[76] Inventor: Herman Burwasser, 1909 Clover Dr., Vestal, N.Y. 13850

[22] Filed: Sept. 21, 1972

[21] Appl. No.: 290,782

[52] U.S. Cl.................. 117/73, 96/87 A, 117/86, 117/138.8 F, 252/8.75, 252/8.8, 260/79.3
[51] Int. Cl.................... C09k 3/16, B32b 27/36
[58] Field of Search............... 117/86, 138.8 F, 73; 96/87 A; 252/8.75, 8.8

[56] References Cited
UNITED STATES PATENTS 2,139,277  12/1938  Lenher et al. ................... 260/457
2,725,297  11/1955  Morey............................... 96/87 A
3,201,251  8/1965  Nadeau et al...................... 96/87 A

FOREIGN PATENTS OR APPLICATIONS 815,662  7/1959  Great Britain..................... 96/87 A

*Primary Examiner*—Ralph Husack
*Attorney, Agent, or Firm*—Walter C. Kehm; Samson B. Leavitt

[57]   ABSTRACT

Indicia receiving matte sheet materials, comprising a polyester base support precoated with a cellulosic film-forming polymer and having an outermost layer of an antistatic composition comprising a sulphonated polystyrene and a cycloaliphatic amine salt of an alcohol sulphate.

7 Claims, No Drawings

INDICIA RECEIVING MATTE SHEET MATERIALS HAVING AN OUTERMOST ANTISTATIC LAYER

This invention relates to indicia receiving matte sheet materials generally and more particularly to an antistatic treating composition which when applied to matte surfaces markedly improves their resistance to the accumulation of electrostatic charges.

Matte sheet materials capable of receiving indicia markings generally comprise a film base at least one surface of which carries a cellulosic matte film-forming lacquer composition. The need for a lacquer coating on the film base is due to the fact that indicia markings on uncoated plastic surfaces will readily rub, peel or flake off. Poor adhesion of the indicia marking on plastic surfaces is particularly troublesome in the drafting field where plastic films, plastic coated drafting cloths, etc. are commonly imaged with ink, pencil, crayon or the like.

Plastic materials, therefore, require a pre-coating, generally a lacquer, in order to accept ink directly to the surface. The most commonly used plastic base support material which requires such a precoat is a polyester. A specific polyester which finds widespread use is a heat-set and biaxially-oriented linear polyester such as terephthalic acid ethylene glycol polyester, sold under the trademarks "Mylar"; "Melinex" or "Celanar".

The matte lacquer coating which has usually been employed heretofore is a cellulosic film-forming polymer dissolved in suitable solvents such as, methylethyl ketone, ethyl acetate, methyl isobutyl ketone, toluene, etc. Included in the lacquer coating may be a plasticizer such as an alkyl resin or phthalate ester. In addition, a hardener such as urea-formaldehyde resin may also be added. This lacquer coating may vary in thickness from 0.2 to 1.0 mil depending on the end use of the plastic media.

In order to provide a matte finish, suitable for indicia marking, the lacquer coating may include a finely divided pigment such as finely powdered glass having a particle size ranging from 2–6 microns, amorphous or diatomaceous silica. Titanium dioxide may also be added to impart a white background color.

A serious failing of such prior matte surfaces is that they exhibit a high degree of susceptibility to the accumulation of electrostatic charges. As a result of such susceptibility, these articles accumulate electrostatic charges which attract dust, lint, tobacco ashes, and like materials and cause such materials to cling tenaciously to the articles. In addition, the dirt pick-up due to electrostatic attraction results in a sticking together of matte surfaces when they are in contact with one another.

It is an object of this invention to provide a coated article which will not be subject to one or more of the above disadvantages.

It is a further object of this invention to provide an improved matte sheet material capable of accepting indicia markings wherein the tendency to build up static surface charges is largely reduced and even completely eliminated.

It is another object of this invention to provide an improved composition and method for treating a matte sheet material to render it free of the effects of electrostatic charges. Other objects and advantages will appear as the description proceeds.

The attainment of the above objects is made possible by this invention which comprises the provision of improved matte sheet materials capable of receiving indicia markings comprising a polyester base, at least one surface of which carries a layer of cellulosic film-forming matte lacquer composition, and at least one outermost layer of an antistatic composition comprising a sulphonated polystyrene and a cycloaliphatic amine salt of an alcohol sulphate.

The above matte lacquer composition may include as the film-forming material a cellulosic compound such as cellulose acetate, cellulose nitrate, cellulose acetate butyrate, cellulose acetate propionate, either alone or in admixture with polyvinylidene chloride, polyvinyl chloride, polyvinyl acetate, polyurethane, polystyrene, polymethyl methacrylate, polyethyl methacrylate, polymethyl acrylate, polyethyl acrylate, the copolymer of acrylonitrile-butadienestyrene, phenol-formaldehyde, urea formaldehyde, polyisocyanates, polyester and polycarbonate.

These matte lacquer compositions in general include the optional or essential solvents, plasticizer, hardeners, and pigments discussed above.

The plastic base support material and/or the matte layer thereon may be transparent, translucent or opaque and may be coated on one or both sides with the antistatic composition. The anti-static composition of the invention can be applied directly to the base support, as for example, an anti-static backwashing solution for application to a matte sheet base support such as polyester prior to applying the matte lacquer coating to the other side of the support. Alternatively, the antistatic agent could be employed in the lacquer layer, on its surface of as a component of a subbing solution or layer used to provide better adhesion between the base support and the lacquer applied thereover. However, best results are obtained when the anti-static composition is employed as the outermost layer.

According to this invention, the aforementioned matte sheet materials are rendered non-susceptible to the accumulation of electrostatic charges by treating the matte sheet materials with an antistatic composition comprising a sulphonated polystyrene and a cycloaliphatic amine salt of an alcohol sulphate.

In achieving the objective of this invention an antistatic treating composition is formulated by dissolving or dispersing in a liquid (preferably aqueous) medium sulphonated polystyrene and a cycloaliphatic amine salt of an alcohol sulphate in which at least one alicyclic radical containing at least 5 carbon atoms is attached to the amine nitrogen atom and the alcohol radical of the alcohol sulphate has at least 5 carbon atoms and the compound altogether contains at least 12 carbon atoms. The antistatic treating composition is then applied to the base support or to the matte surface in any one of the manners described above. When applying the antistatic composition to a surface of the matte sheet material via a coating technique one can use any known coating method such as, for example; air knife, reverse roll bead or wire wound rod. It can also be applied merely be dipping, spraying, swabbing the surface with a cloth saturated with the antistatic treating composition, etc. The amount of antistatic treating composition applied or added is not a critical factor and may range from about 1 to 10 grams per sq. meter of the sheet material. After application of the antistatic treating composition, drying can be accomplished by ambient evaporation, forced air or heated oven or the like. Likewise, the amount of solids applied or added from the antistatic treating composition is not a critical factor and may range from about 0.05 to 0.5 gram per sq. meter of sheet material.

The sulfonated polystyrene described in the present invention is either in its free acid form or in the form of salts thereof and may be prepared by any of the known methods such as those disclosed in U.S. Pat. Nos. 2,533,210; 2,533,211; and 2,718,514. The molecular weight of these polymers is not deemed critical in this application and sulfonated polystyrene in the molecular weight range of from about 50 to about 2,000,000 are suitable in this invention. Preferably, the sulfonated polystyrene has a molecular weight range of from about 50 to 600,000. For use in the practice of this invention the sulfonated polystyrene should have an average degree of sulfonation of about 0.75 to 4 units, and more preferably about 1 to 2 units, of sulfonic acid or salts thereof per repeating styrene unit.

As used in the invention, the term sulfonated polystyrene also contemplates the use of sulfonated alkyl ($C_{1-4}$) and halogen derivatives of polystyrene such as sulfonated polymers of alpha methyl styrene, vinyl toluene, chlorostyrene, etc. wherein the alkyl and halogen groups are present in any suitable number as ring or side chain substituents or both.

The only critical requirement in regard to the molecular weight and the degree of sulfonation of the sulfonated polystyrene is that the molecular weight should not be so high nor the degree of sulfonation so low as to preclude the solubility of the sulfonated polystyrene and salts thereof in aqueous solution. In this regard, the polymeric material should have a solubility of at least 2% by weight in aqueous solution at 25°C.

The sulfonated polystyrene may be used in free acid form or in salt form, preferably as the ammonium or alkali metal salts. The term ammonium includes both ammonium per se and amines which are considered substituted ammonium. Examples of suitable amines which may be used include mono-, di-, and tri-ethanol amines, morpholine, picoline, quinoline, etc. Especially useful are those hydroxy amines such as the ethanolamines and other related substances wherein the hydroxy groups increase the water solubility of the sulfonated polystyrene. The concentration of the sulphonated polystyrene in the treating composition is not critical and may vary from about 0.1% to about 2.5% by weight, depending on coating equipment and conditions.

The cycloaliphatic amine salts of alcohol sulfate utilized in the present invention are cycloaliphatic amine salts of an alcohol sulphate in which at least 5 carbon atoms is attached to the amine nitrogen atom and the alcohol radical of the alcohol sulphate has at least 5 carbon atoms and the compound altogether contains at least 12 carbon atoms and they may be prepared by any of the known methods such as those disclosed in U.S. Pat. No. 2,139,277.

The cyclo-aliphatic amine salts of alcohol sulphates utilized in the present invention include, but are not limited to the diethycyclohexylamine salt of lauryl sulphate, diethylcylohexylamine salt of decyl sulphate, methyl-butyl-cyclohexylamine salt of octadecyl sulphate, dipropycyclohexylamine salt of benzyl sulphate, decahydronaphthyldiethylamine salt of hexadecyl sulphate, ethylisopropylcyclohexylamine salt of octyl sulphate, diethylcyclohexylamine salt of furfuryl sulphate, tetrahydronaphthyldiethylamine salt of lauryl sulphate and dimethylcyclopentylamine salt of furfuryl sulphate and the like. The concentration of the cycloaliphatic amine salt of an alcohol sulphate in the treating composition is not critical and may vary from about 0.5% to about 5% by weight, depending on coating equipment and conditions.

It is to be additionally noted that utilization of either the sulfonated polystyrene alone or the cycloaliphatic amine salt of an alcohol sulfate alone results in matte sheet materials possessing inferior properties such as tackiness, waxiness and poor adhesive properties as compared to materials treated with compositions containing both essential ingredients.

The following examples describe in detail the method and materials that comprise the present invention and are intended to be illustrative of said invention and not limiting thereof. All parts and proportions referred to herein and in the appended claims are by weight unless otherwise indicated.

This invention is not limited to improving the antistatic properties of the film elements mentioned in the following examples but will improve the antistatic properties of the numerous elements already indicated.

EXAMPLE 1

An antistatic treating composition is prepared by mixing 0.5 gram of a sodium salt of sulphonated polystyrene and 1.25 grams of the diethylcyclohexylamine salt of lauryl sulphate into 100 cc of water.

This antistatic treating composition is applied to a cellulose acetate propionate lacquer coated polyester base by roller coating in conjunction with an air knife, and dried to obtain a thin uniform coating having the desired antistatic properties.

EXAMPLE 2

The procedure of Example 1 is repeated, except the antistatic treating composition is instead prepared by mixing 1.0 grams of the sodium salt of the same sulphonated polystyrene and 2.5 grams of the diethylcyclohexylamine salt of lauryl sulphate into 100 cc of water. Similar results are obtained.

EXAMPLES 3 and 4

Examples 1 and 2 are repeated respectively using an ammonium salt of sulphonated polystyrene in place of the sodium salt of sulphonated polystyrene described in Examples 1 and 2. Similar results are obtained.

EXAMPLES 5 and 6

Examples 1 and 2 are repeated respectively using the sulphonated polystyrene in its free acid form in place of its sodium salt. Similar results are obtained.

EXAMPLES 7 and 8

Examples 1 and 2 are repeated respectively using the methyl-butylcyclohexyamine salt of octadecyl sulfate in place of the diethylcyclohexylamine salt of lauryl sulphate described in Examples 1 and 2. Similar results are obtained.

EXAMPLES 9 and 10

Examples 1 and 2 are repeated respectively using the diethylcyclohexylamine salt of decyl sulphate in place of the diethylcyclohexylamine sulphate salt of lauryl sulphate described in Examples 1 and 2. Similar results are obtained.

The articles produced in Examples 1 through 10 when tested are shown to be substantially resistant to the accumulation of electrostatic charges. They exhibit lack of attraction for fine particles of dust, pulverized cigarette ashes and other similar non-conducting particles over extended periods of time. Further the antistatic layer of this invention has good adhesion to the undersurface to which it is applied, and is non-tacky and non-waxy thru a range of sensitivities of about $10^7-10^{10}$ ohms.

This invention has been disclosed with respect to certain preferred embodiments and it will be understood that modifications and variations thereof will become obvious to persons skilled in the art and are intended to be included within the spirit and purview of this application and the scope of the appended claims.

I claim:

1. An improved matte sheet material capable of receiving indicia markings comprising a polyester base sheet, at least one surface of which carries a layer of cellulosic film forming lacquer composition, and at least one outermost layer of an antistatic composition comprising a sulfonated polystyrene and a cycloaliphatic amine salt of an alcohol sulfate in which at least one alicyclic radical containing at least 5 carbon atoms is attached to the amine nitrogen atom and the alcohol radical of the alcohol sulfate has at least 5 carbon atoms and the compound altogether contains at least 12 carbon atoms.

2. The matte sheet material of claim 1 wherein the sulfonated polystyrene is in the form of its free acid.

3. The matte sheet material of claim 1 wherein the sulfonated polystyrene is in the form of its alkali metal salt.

4. The matte sheet material of claim 1 wherein the sulfonated polystyrene is in the form of its ammonium salt.

5. The matte sheet material of claim 1 wherein the cycloaliphatic amine salt of an alcohol sulfate is the diethylcyclohexylamine salt of lauryl sulfate.

6. The matte sheet material of claim 1 wherein the cycloaliphatic amine salt of an alcohol sulfate is the methylbutylcyclohexylamine salt of octadecyl sulfate.

7. The matte sheet material of claim 1 wherein the cycloaliphatic amine salt of an alcohol sulfate is the diethylcyclohexylamine salt of decyl sulfate.

* * * * *